United States Patent [19]

Muschelknautz et al.

[11] Patent Number: 4,494,970

[45] Date of Patent: Jan. 22, 1985

[54] APPARATUS FOR PRODUCTION OF FIBER MATS

[75] Inventors: Edgar Muschelknautz, Leverkusen; Norbert Rink, Dormagen, both of Fed. Rep. of Germany

[73] Assignee: Bayer Aktiengesellschaft, Leverkusen, Fed. Rep. of Germany

[21] Appl. No.: 346,786

[22] Filed: Feb. 8, 1982

Related U.S. Application Data

[62] Division of Ser. No. 251,807, Apr. 7, 1981, Pat. No. 4,343,639.

[30] Foreign Application Priority Data

Apr. 25, 1980 [DE] Fed. Rep. of Germany ....... 3016114
Jun. 20, 1980 [DE] Fed. Rep. of Germany ....... 3023016

[51] Int. Cl.$^3$ .............................................. C03B 37/06
[52] U.S. Cl. ........................................... 65/9; 65/4.4; 65/16; 425/7; 425/115
[58] Field of Search .................... 65/4.4, 9, 5, 16; 264/5, 121; 425/7, 115

[56] References Cited

U.S. PATENT DOCUMENTS

| 2,318,244 | 5/1943 | McClure | 65/9 X |
| 2,751,962 | 6/1956 | Drummond | 65/9 X |
| 2,897,874 | 8/1959 | Stalego et al. | 65/4.4 X |
| 3,006,797 | 10/1961 | Labino | 65/9 X |
| 3,442,633 | 5/1969 | Perry | 65/9 X |
| 3,445,207 | 5/1969 | Goerens | 65/9 X |
| 3,844,751 | 10/1974 | Stewart | 65/4.4 |

FOREIGN PATENT DOCUMENTS 1027851 4/1958 Fed. Rep. of Germany ......... 65/4.4

Primary Examiner—Robert Lindsay
Attorney, Agent, or Firm—Sprung, Horn, Kramer & Woods

[57] ABSTRACT

In a process for the production of mats made of organic or inorganic fibres, comprising dispersing fibers in a flowing gas so as to issue together from a channel, depositing the fibers on a perforated conveyor belt for the formation of the mat, and removing the gas by suction below the conveyor belt, the improvement which comprises (a) disposing the conveyor belt so as to form an angle of about 90 to 150° with the direction of gas flow at the outlet of the channel;

(b) deflecting the gas flow on one side of the channel in the direction of the conveyor belt such that the gas flow is deflected in the direction of the conveyor belt by the Coanda-effect after issuing from the channel;

(c) the deflected gas flow entraining ambient air or recirculated gas from the surroundings in the direction of the conveyor belt downstream of the deflection;

(d) on the opposite side of the channel ambient air flowing into the region of the fiber deposit between the conveyor belt and the lower edge of the channel in the direction of movement of the conveyor belt, at an angle of about 45 to 90° to the direction of gas flow at the channel outlet; and (e) removing the total flow by suction on the conveyor belt such that the gas carrying the fibers takes an S-shaped path to the conveyor belt with a double deflection, whereby the direction of flow is at an angle of from 0 to about 30° with the conveyor belt at the turning point.

5 Claims, 4 Drawing Figures

APPARATUS FOR PRODUCTION OF FIBER MATS

This is a division of application Ser. No. 251,807, filed Apr. 7, 1981 now U.S. Pat. No. 4,343,639, granted Aug. 10, 1982.

The present invention relates to a process for the production of mats made of organic or inorganic fibers, and to an apparatus for carrying out the process.

Mats are three dimensional structures of irregularly positioned fibers, whose density by volume may be between 1/10 and 1/1000 of the density of the individual fibers. If continuous fibers are used in the mat production process, the mat achieves its cohesion from a mutual irregular looping action between the individual fibers. In mats made of short fibers, the individual fibers have to be bonded by a binder at their crossing points. Hitherto, mineral fiber mats in particular have been produced as short fiber mats. The characteristics of such mats depend on the characteristics of the individual fibers, such as elasticity, bending strength, diameter and length, and also on the density by volume, the relative arrangement of the fibers and the quantity and distribution of the binder.

Most fiber mats are used for heat insulation purposes. Ideally, the majority of the fibers should be orientated within the plane of the mat transversely to the flow of heat, and in as regular a distribution as possible.

Also, the mats should have as good a dimensional stability as possible in their longitudinal and lateral direction and should have as good an elastic compressionability as possible in their thickness direction. For example, glass fiber mats of small density by volume are compressed to 1/6 of their thickness, e.g. by rolling the mat under pressure, for several days or weeks for storage and transport. After relaxing the mat in use thereof, the original mat thickness should, as far as possible, be reproduced.

The dimensional stability is impaired in particular by the fact that, during the deformation of the mat, breaks in the fibers occur. When mats are rolled or compressed, the individual fibers which resist most easily are those arranged in the mat perpendicularly to the resulting forces. Therefore, it is desirable to arrange the fibers predominantly in the plane of the longitudinal and lateral directions of the mat. On the other hand, it is necessary for the cohesion of the mat that a certain number of fibers are orientated in the direction of the thickness of the mat, so that the mat does not disintegrate into layers.

Another problem which arises during the production of mats is that of producing as regular a density as possible within the mat. The elastic compressibility, the heat insulation characteristics and the cohesion of the mat are all impaired by fluctuations of the density within the mat. Therefore, during the production of the raw mat, the fibers should be supplied as separately as possible to the mat. The fibers of the mat being produced are supplied suspended in a relatively fast flowing gas stream, wherein the gas stream deposits the fibers on passing through the portion of mat which has already been formed. Whirl formations and mutual overtaking by fibers varying in speed in the flow of gas causes fibers to run against each other at some distance upstream of the depositing point, to "hook together" and to form "balls" or "fiber clouds". Such fibrous spun yarns catch other individual fibers passing through the same whirling and overtaking procedures and continuously increase in size. Electrostatic forces may thereby also be involved. Such spun yarns formed in the flow clearly have a different structure than the structure produced during the actual mat formation from individual fibers. They cause considerable inhomogeneities depending on their quantity and size. Mats obtainable on the market predominantly consist of such clouds or spun yarns with dimensions of a few centimeters to a few decimeters, and this may be easily determined by "pulling apart" the mat.

An object of the present invention is, therefore, to provide a process for the production of mats made of organic or inorganic fibers, in which individual fibers dispersed in a stream of gas are deposited on a perforated conveyor belt (41) for the formation of the mat (42) such that the conditions mentioned above for the fiber deposit are optimally achieved, wherein the gas is removed by suction below the conveyor belt.

In principle, it would be possible to achieve the object mentioned by diluting, in any manner, the dispersion of the fibers in the gas. However, a process of this type is undesirable for energetic as well as for environmental considerations because a large quantity of gas has to be transported, removed by suction and purified of the residue of the binder.

The process according to the invention is characterized by the following features:

(a) the conveyor belt (41) forms an angle of about 90° to 150°, preferably about 100° to 120°, with the direction of gas flow at the channel outlet;

(b) a curved deflection member (31) is positioned on one side of the channel (2), as an extension in the direction of the conveyor belt, such that the gas flow is deflected in the direction of the conveyor belt by a Coanda-effect of the deflection member after issuing from the channel;

(c) the deflected gas flow entrains ambient air or recirculated gas from the surroundings (47) in the direction of the conveyor belt downstream of the deflection member (31);

(d) on the side of the channel (2) opposite the deflection membeer (31), ambient air or recirculated gas flows into the region of fiber deposit (3) between the conveyor belt (41) and lower edge of the channel (2), in the direction of movement of the conveyor belt, at an angle of about 45° to 90° to the gas flow direction at the channel outlet;

(e) the total flow is removed by suction on the conveyor belt such that the gas carrying the fibers takes an S-shaped path to the conveyor belt (41) with a double deflection, whereby the direction of flow is at an angle of from 0° to about 30° with the conveyor belt at the turning point.

The numbers specified in brackets relate to the figures described in detail in the following:

Figure 1:
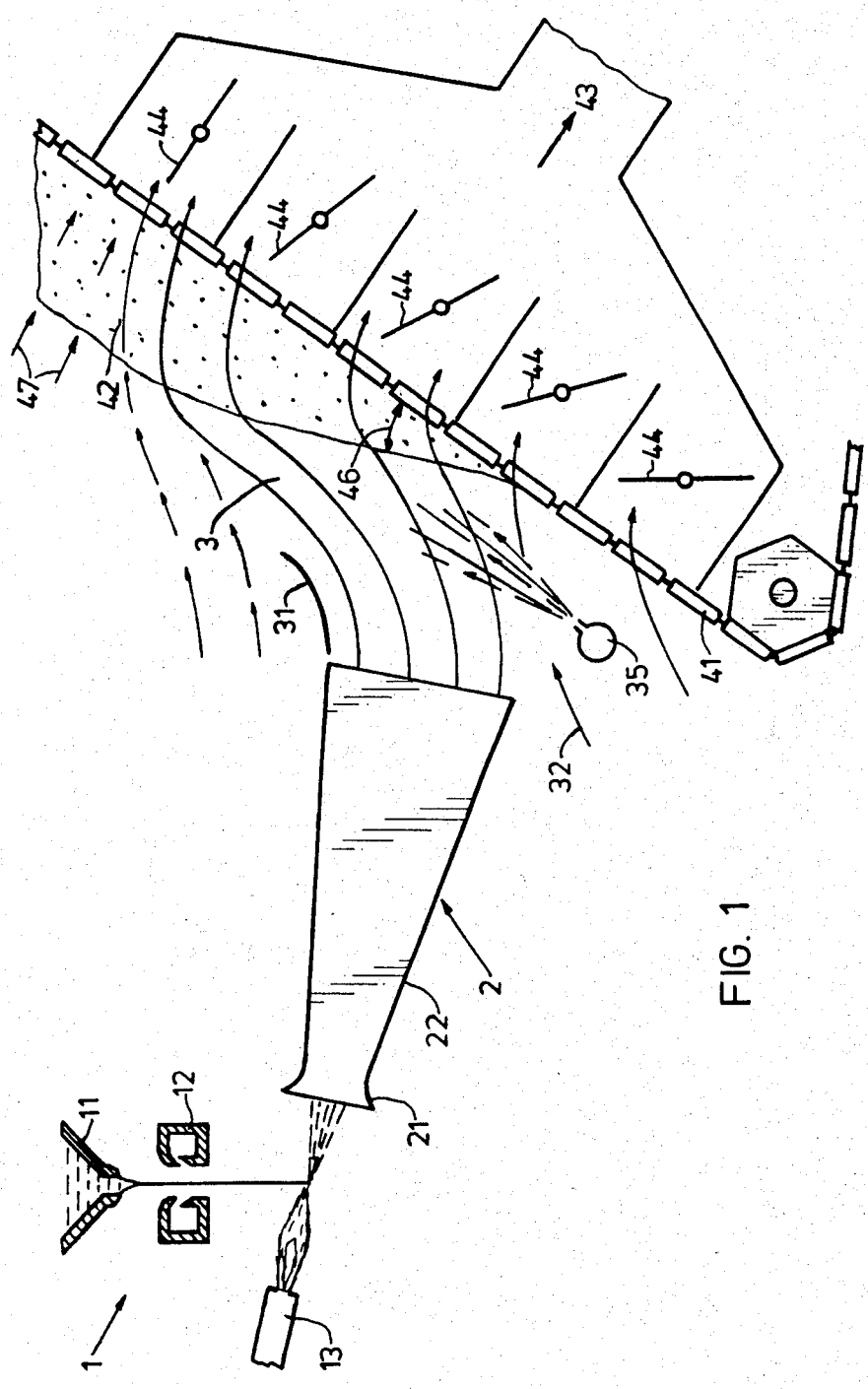
FIG. 1 is a cross section through a first embodiment of the apparatus according to the invention.

The numbers specified in the figures designate the following:

1: Fiber production device

11: Melting crucible
12: Blasting nozzle
13: Flame to separate into fibers
2: Channel
21: Inflow part of the channel
22: Subsonic diffuser
23: Inlet cone
24: Transition part
25: Flow dividing plates in the channel
3: Deflection region of the flow
31: Deflection member
32: Air drawn in by suction or recirculated gas
33: Sheet metal deflector
34: Sheet metal deflector
35: Binder spraying device
36: Suction-removal of gas
4: Suction-removal region and fiber deposit
41: Conveyor belt
42: Fiber mat
43: Direction of flow
44: Throttle valve
45: Contour plates
46: Angle of slope of the mat
47: Ambient air downstream of the belt The process for the production of mats generally comprises a unit for separation of fibers (1), in which the fibers are produced as individual fibers dispersed in a flow of gas. The gas, which has generally already drawn out the fibers, is used subsequently as a transport medium for the fibers and enters into a channel (2) through which it is channelled for the mat production. As direct a flow as possible should be regulated and maintained in the channel, without whirls and blackflow, in order to suppress the cloud formation described above. The shape of the channel may be designed according to the relative positions of the fiber production unit and the fiber deposit. For example, curves may be included as long as the radius of curvature selected is not too small. Also, a transition from, for example, a rotationally symmetrical fiber production unit to a slit-shaped channel outlet for the production of a wide fiber deposit may be provided. The fiber production unit and fiber deposit are preferably relatively positioned such that a rectilinear channel which is not too long may be used. The gas usually still has a very fast flow rate immediately after the process of separating the fibers, which rate usually lies in the near-sonic region. In this case, the channel preferably comprises a subsonic diffuser, so that the speed of the gas is reduced while flowing through the channel. The gas speed at the outlet of the channel should preferably be between 5 and 20 m/sec.

After leaving the channel the gas flow which carries the fibers is deflected twice, firstly in the direction of the movement of the conveyor belt and secondly in a direction perpendicular to the plane of the conveyor belt. The first deflection is mainly effected by a Coanda-effect at a curved deflection member and, to a smaller extent by the ambient air flowing in between the gas flow of the channel (2) containing the fibers and the conveyor belt, or by gas recirculated there. The Coanda-effect alone is sufficient to deflect the main flow. The mixing of the transport gas carrying the fibers with the ambient air also causes a further reduction in the flow rate of the gas and therefore also of the fibers. The second deflection, which creates an S-shaped flow path, is effected by suction-removal of the gas below the conveyor belt in a direction perpendicular to the plane of the conveyor belt. As the fibers in the gas are preferably orientated perpendicularly to the flow, they are preferably deposited such that they are orientated in the plane of the sloping face of the mat being produced, the majority lying transversely to the direction of the conveyor belt. When the angle of slope (46) is small, the amount of fibers orientated perpendicularly to the plane of the mat is small, which amount increases as the angle of slope increases. The angle of slope together with the belt speed are influenced by the angle of the gas flow carrying the fibers at the turning point, as well as by the length of the suction-removal zone and the distribution, effected there, of the amounts of the gas which have been removed by suction. Since, however, it is only the statistical mean of the orientation of the fibers in the flowing gas which is oriented perpendicularly to the direction of flow, there is also a sufficient number of fibers in an orientation such that at the moment of impact on the raw mat they are embedded in the mat and thereby contribute to the cohesion of the mat.

The air is preferably removed by suction, below the conveyor belt such that initially a little, then in the region of the sloping face the majority and subsequently the rest is removed by suction, whereby the quantity removed by suction in the region of the sloping face constantly increases. It may also be advisable to not only remove by suction the ambient air or recirculated gas carried along by the main flow carrying the fibers, in the last section, but also another small part from the remaining surroundings (47) downstream with respect to the direction of travel of the belt, of the actual suction-removal zone.

An apparatus according to the invention is shown in FIG. 1. A nozzle drawing-blast apparatus for the production of extremely fine fibers in the range of from 2 to 5μ thick, is shown as the fiber production device. In this process, melt streams issue from a melting crucible 11, which streams are initially drawn out into threads between 20 and 50μ thick in a drawing nozzle 12 and then pass into a burner 13 in which the primary thread is separated into fibers by the high speed combustion gases. Hence, the threads are produced in a combustion gas stream which flows substantially horizontally. In practice, the crucible (11) consists of a rectangular groove which extends perpendicular to the drawing plane, with, for example, 100 or more melt outlet openings from which primary threads are drawn out and pass through a slit-shaped nozzle (12), which extends perpendicular to the drawing plane. Either one burner (13) is provided for each thread or a common burner is provided for all threads which produces a flame wall which accordingly extends perpendicular to the drawing plane. The gases from the flames now enter into the channel (2), with the fibers suspended therein, after cooling by mixing with ambient air. The channel (2) itself consists of a nozzle-shaped inlet part (21) and a subsonic diffuser (22), in which the flow rate of the gases is reduced from 5 to 20 m/sec.

A sheet metal deflector (31) is provided at the outlet end of the diffuser, with which deflector the gas flow makes contact due to the Coanda-effect, so that the gas is deflected as shown by the flow lines. Furthermore, a spraying device (35) is provided, which sprays the binder into the deflection region (3) of the flow to bond the fibers. The deflection of the flowing gas and of the fibers is increased due to the spraying direction of the binder. Ambient air simultaneously flows into the deflection region (3) from the side of the subsonic diffuser (22) opposite the sheet metal deflector (31).

The conveyor belt (41) is also illustrated in the form of a link conveyor. The space below the conveyor belt (41) is divided into chambers. Each of the chambers contains a throttle valve (44) so that the flow resistance may be individually regulated by each of the chambers. The gas is removed by suction in the direction of the arrow (43). The throttle valves (44) are preferably adjusted such that the distribution of the quantity of gas previously described is achieved. While the gas passes through the conveyor belt or the mat (42) which is being produced, the fibers are deposited on the conveyor belt. At the moment when the fibers are deposited, the gas flow rate is from 1 to 10 m/sec., preferably from 3 to 5 m/sec.

It is particularly preferable that the quantity of gas removed by suction through the conveyor belt is throttled in stages into at least two sections, so that an average flow rate through the conveyor belt of from 1 to 4 m/s is achieved in the first sections, not yet covered with fibers, of the conveyor belt and in the subsequent sections which are already covered with fibers, flow speeds of from 4 to 10 m/s are achieved.

Figure 2:
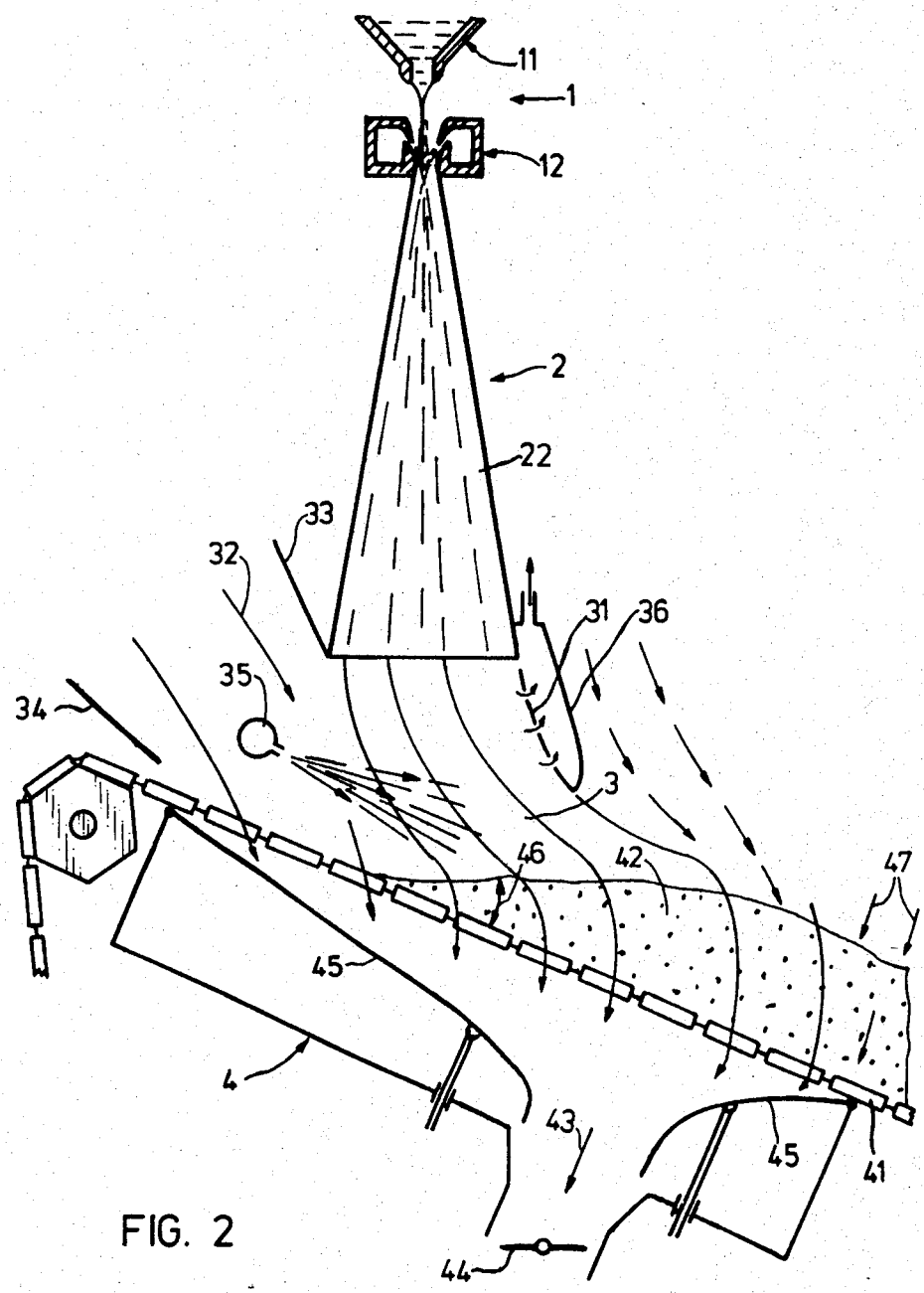
FIG. 2 is a cross section through an apparatus according to the invention, whereby individual elements are shown in alternative embodiments.

The embodiment of the invention according to FIG. 2 shows a fiber production device 1 operating according to the jet blast process. In this embodiment, a plurality of melt streams arranged in a row issue from a rectangular melting crucible (11), perpendicular to the drawing plane, which melt streams are separated into fibers in a slit-shaped separating nozzle (12), which is disposed downstream. The channel (2) is again designed as a subsonic diffuser (22). The deflector (31) positioned at the outlet end of the subsonic diffuser, is perforated and has a suction case (36). Transport gas is removed by suction through the suction case to assist the deflection of the flow of transport gas. The removal by suction is preferably effected in the same measure as the fibers are separated from the transport gas as a result of the deflection so that the fibers are prevented from adhering to the deflector (31). Deflectors (33) and (34) are also positioned on the opposite side of the channel (2), which direct the ambient air flowing into the region between the conveyor belt and the main flow. Adjustable contour plates (45) are provided below the conveyor belt, instead of suction cases provided with throttle valves, by which plates the flow resistance may be regulated below the conveyor belt (41) such that the required distributor of the quantity of gas removed by suction is achieved.

Figure 3:
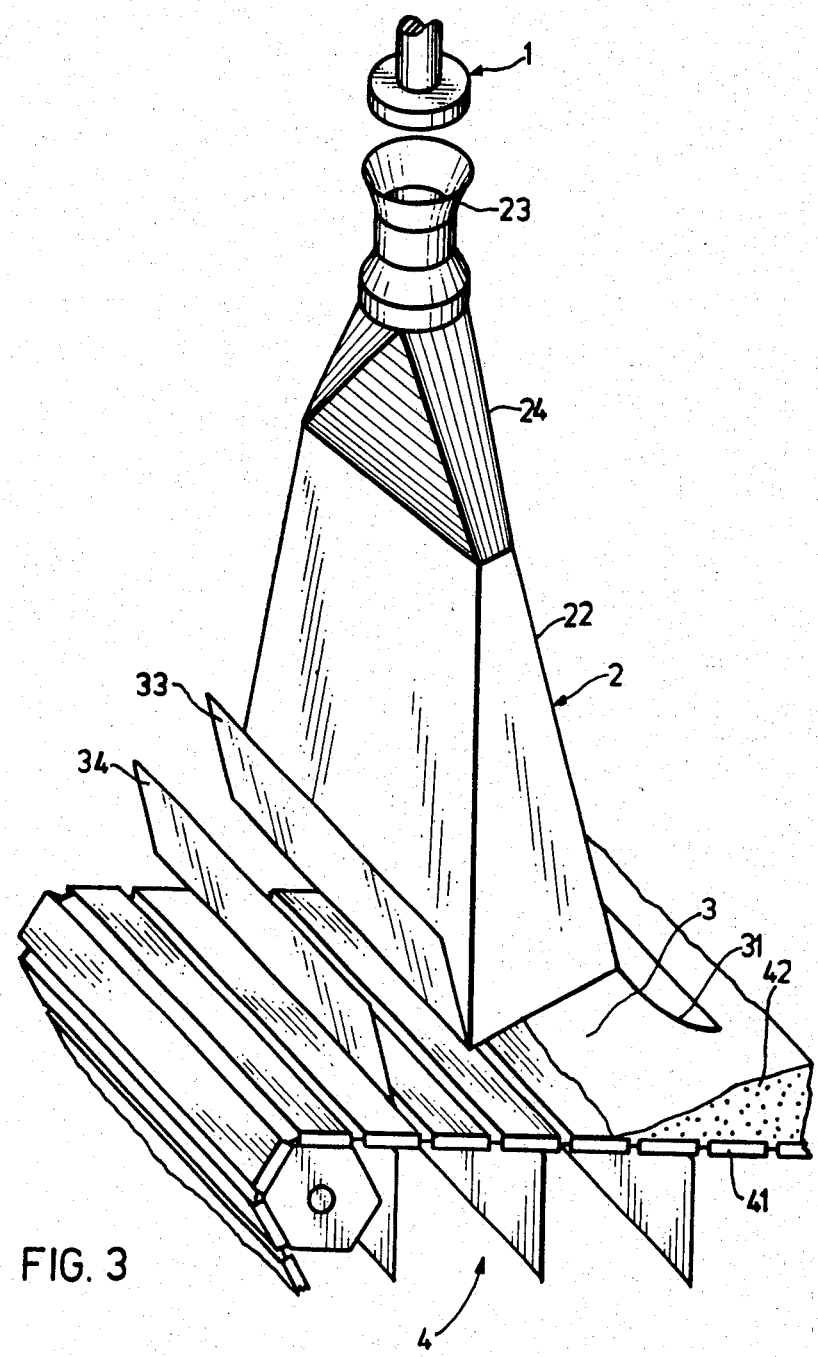
FIG. 3 is a perspective view of the apparatus according to the invention in connection with a specific fiber production device.

The embodiment according to FIG. 3 shows a fiber production device (1) operating according to the drum centrifuge blasting process (TEL-process). Here, the flow of blasting gas and the fibers enter into a funnel-shaped inlet end (23) of the channel (2) with a rotationally symmetrical cross section. The channel (2) also has a transition part (24), to which is connected the subsonic diffuser (22).

Figure 4:
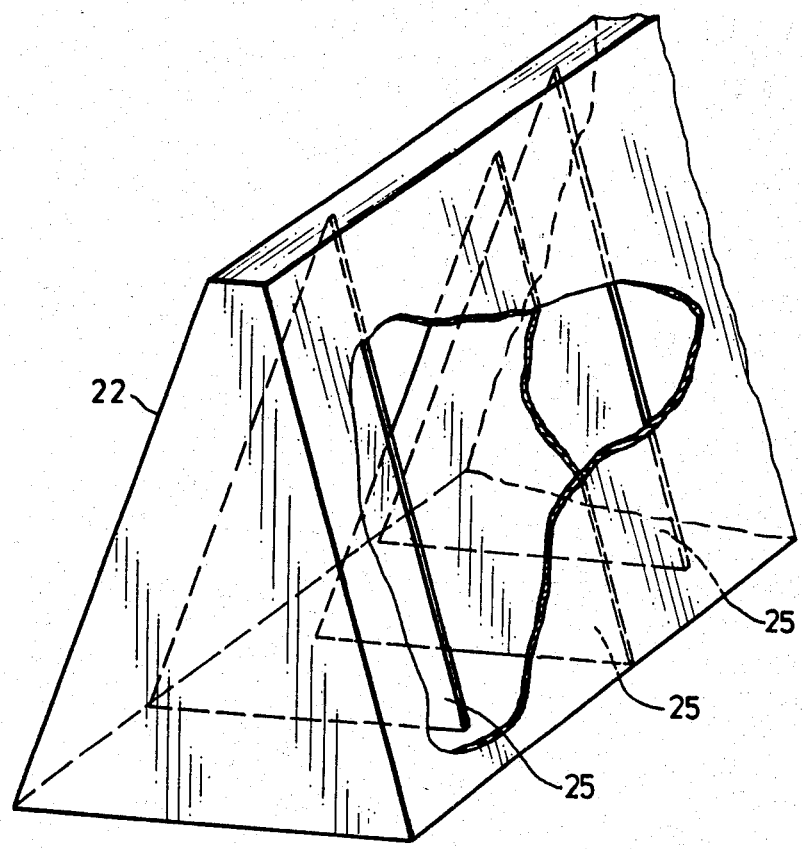
FIG. 4 is a specific embodiment of the channel.

FIG. 4 shows a subsonic diffuser to be used, according to the invention, as the channel (2) in a partly cut away form. The depth of such a diffuser may extend over the total width of the fiber mat. It is then proposed, according to the invention, to provide flow dividing plates (25) in the channel which prevent transverse flow. In order to avoid a deposit of fibers on the upper edge of the flow dividing plates (25), these plates (25) do not extend over the total width of the diffuser, but are only attached, on the one side, to one wall thereof. The free edge which extends substantially parallel to the other wall of the diffuser, forms an acute angle with the direction of the gas flow. Fibers impinging on this edge may slide down on the edge, without congesting the diffuser. The individual flow dividing plates are preferably attached alternately on both diffuser walls. The figure illustrates a diffuser (22) in a perspective view, in which one wall is partly cut away.

It will be appreciated that the instant specification and examples are set forth by way of illustration and not limitation, and that various modifications and changes may be made without departing from the spirit and scope of the present invention.

We claim:

1. An apparatus for the production of mats made of organic or inorganic fibers, consisting essentially of a member forming a channel, means for providing and introducing a flowing dispersion of fibers and gas into said channel, a perforated conveyor belt at an angle of about 90° to 150° relative to the channel, said conveyor belt being spaced from the outlet of the channel so as to allow surrounding air to enter into the open space between channel and conveyor belt, a curved deflection and guiding member positioned on one side of the channel outlet traversely to the conveyor belt, and means for removing the gas by suction below the conveyor belt, channel, deflection member and suction means being in positions relative to each other that gas flows from the channel outlet to the conveyor belt in an S-shaped path.

2. An apparatus according to claim 1, wherein the curved deflection member includes perforations or slits and suction means on the reversed side of the deflection member whereby gas is removed, so that the fibers transported in the flow follow the contour of the deflector.

3. An apparatus according to claim 1, including a sheet metal deflector directing the inflow direction of the ambient air.

4. An apparatus according to claim 1, including flow dividing plates positioned within the channel so as to prevent transverse flow.

5. An apparatus according to claim 1, wherein the channel is designed as a subsonic diffuser so that the flow rate of gas is reduced in the channel.

* * * * *